UNITED STATES PATENT OFFICE 2,687,971

PLASTICIZED CELLULOSE ESTER COMPOSITION

John D. Brandner and Robert H. Hunter, Wilmington, Del., assignors to Atlas Powder Company, Wilmington, Del., a corporation of Delaware No Drawing. Application August 29, 1950, Serial No. 182,123

1 Claim. (Cl. 106—179)

This invention relates to plasticized compositions of cellulose esters and more particularly to plasticized compositions of cellulose esters high in propionyl and butyryl content.

It is an object of the invention to provide novel plasticized compositions of cellulose acetate-butyrate and of cellulose propionate.

Another object is to provide plasticized compositions of cellulose acetate-butyrate and cellulose propionate which are particularly suited for compression and injection molding.

A still further object is to provide compositions of cellulose esters high in butyryl and/or propionyl content modified with a plasticizer of high solvency for and compatibility with the said esters and of low volatility, which compositions mill well and, upon molding, yield products of high impact strength, low water absorption and high heat stability.

The above and other objects will become apparent in the course of the following description and the appended claims.

The plasticizer employed in the novel compositions of the present invention is phenoxyethoxyethyl palmitate. This compound may be readily synthesized in a number of ways and is not herein claimed as a new compound. A preferred method of synthesis is by the direct esterification of palmitic acid with phenoxyethoxyethanol which latter may be the product of reaction between one mol of phenol and 2 mols of ethylene oxide or the product obtained by reaction between equimolar quantities of dichlor ethyl ether and alkali phenolate followed by hydrolysis of the chlorine atom from the resulting phenoxyethoxyethyl chloride.

The palmitate ester may be prepared by reaction between stoichiometric quantities of the ether-alcohol and palmitic acid, usually in the presence of catalyst, or preferably, by the reaction between a considerable excess of phenoxyethoxyethanol and palmitic acid in the absence of a catalyst followed by vacuum stripping of unreacted ether-alcohol.

The ether-alcohol and palmitic acid so esterified need not be chemically pure compounds to produce useful plasticizers for use in the compositions hereinafter described. Mixtures of acids rich in palmitic and the mixture of ether-alcohols obtained by the direct addition of ethylene oxide to phenol in a 2 to 1 molar ratio may be employed to prepare entirely suitable plasticizers for the purposes of the invention.

The cellulose esters employed with the plasticizer hereinbefore described to produce the novel composition are selected from the group consisting of cellulose propionate containing from 0.2 to 0.5 free hydroxyl groups per anhydro glucose unit; and cellulose acetate-butyrate of from 5% to 20% acetyl content, from 25% to 50% butyryl content and containing from 0.2 to 0.5 free hydroxyl groups per anhydro glucose unit.

The proportion of plasticizer to cellulose ester in compositions of the present invention may vary somewhat according to the choice of ester and the purpose for which the composition is intended as is well understood in the art. In general, however, compositions containing from about 5% to about 15% by weight of phenoxyethoxyethyl palmitate based on the sum of the plasticizer and cellulose ester will be found useful. Preferred compositions for molding powders are those based on cellulose acetate-butyrate of approximately 13% acetyl and 37% butyryl content plasticized with from 5% to 15% phenoxyethoxyethyl palmitate.

The following examples are illustrative of compositions made in accordance with the invention.

Example I 10 parts by weight of phenoxyethoxyethyl palmitate and 90 parts by weight of granular cellulose acetate butyrate of approximately 13% acetyl and 37% butyryl content, and 20 seconds viscosity, were mixed together and fed onto a 2-roll mill preheated to 310° F. Milling at that temperature was continued for 10 minutes to form a light colored translucent sheet of great toughness. No development of odor during milling was observed. The milled sheet was chipped and compression molded at 370° F. for 15 minutes under a pressure of approximately 7,000 pounds per square inch to form a disk of high clarity and light color. The resistance of the molded product to cold water leaching and to volatilization on warm storage was very good and the impact strength unusually good.

Example II 12 parts by weight of phenoxyethoxyethyl palmitate and 88 parts by weight of the cellulose acetate-butyrate described in Example I were intimately mixed together to form a molding powder. A portion of the powder was compression molded at 365° F. for 15 minutes at approximately 7,000 pounds per square inch to form a disk of good clarity and light color. Its impact resistance was very high and the molded

Example III 15 parts by weight of phenoxyethoxyethyl palmitate and 85 parts by weight of granular cellulose propionate were intimately mixed to form a molding powder. A disk was compression molded from the powder at a temperature of 400° F. for 7 minutes at approximately 5,000 pounds per square inch. The disk was clear, of light color and of good impact strength.

It will be readily recognized by those skilled in the art that the formulas of the above illustrative examples may be modified without departing from the spirit of the invention. Thus, coloring matter such as dyes or pigments may be added; or inert filters incorporated into the molding; or auxiliary plasticizers or resins may be added in minor proportions to modify the properties in known manner.

What is claimed is:

A plasticized composition consisting essentially of from about 5% to about 15% by weight of phenoxyethoxyethyl palmitate and from about 95% to about 85% by weight of a cellulose acetate-butyrate of about 13% acetyl content, and about 37% butyryl content.

References Cited in the file of this patent

UNITED STATES PATENTS

| Number | Name | Date |
|---|---|---|
| Re. 19,705 | Izard | Sept. 17, 1935 |
| 2,202,066 | Platt | May 28, 1940 |
| 2,372,980 | Piech | Apr. 3, 1945 |